United States Patent
Beggel et al.

(10) Patent No.: US 11,429,868 B2
(45) Date of Patent: Aug. 30, 2022

(54) METHOD FOR DETECTING AN ANOMALOUS IMAGE AMONG A FIRST DATASET OF IMAGES USING AN ADVERSARIAL AUTOENCODER

(71) Applicant: Robert Bosch GmbH, Stuttgart (DE)

(72) Inventors: Laura Beggel, Stuttgart (DE); Michael Pfeiffer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 979 days.

(21) Appl. No.: 16/171,637

(22) Filed: Oct. 26, 2018

(65) Prior Publication Data

US 2019/0130279 A1    May 2, 2019

(30) Foreign Application Priority Data

Oct. 27, 2017   (EP) .................................... 17198775

(51) Int. Cl.
*G06N 3/08*      (2006.01)
*G06K 9/62*      (2022.01)
(Continued)

(52) U.S. Cl.
CPC ........... *G06N 3/088* (2013.01); *G06K 9/6256* (2013.01); *G06K 9/6269* (2013.01);
(Continued)

(58) Field of Classification Search
CPC .... G06K 9/6256; G06K 9/6269; G06N 20/10; G06N 3/0454; G06N 3/0472; G06N 3/088; G06N 5/045; G06V 10/82
See application file for complete search history.

(56) References Cited

U.S. PATENT DOCUMENTS

2015/0254555 A1*   9/2015   Williams, Jr.   ....... G06N 3/0454
                                                     706/14
2017/0220951 A1*   8/2017   Chidlovskii   ............ G06F 16/35
(Continued)

OTHER PUBLICATIONS

Leveau et al., "Adversarial Autoencoders for Novelty Detection", Feb. 21, 2017, ICLR 2017, pp. 1-6 (Year: 2017).*
(Continued)

*Primary Examiner* — Brent Johnston Hoover
(74) *Attorney, Agent, or Firm* — Norton Rose Fulbright US LLP; Gerard Messina

(57) ABSTRACT

A method for detecting an anomalous image among a dataset of images using an Adversarial Autoencoder includes training an Adversarial Autoencoder in a first training with a training dataset of images, with the Adversarial Autoencoder being optimized such that a distribution of latent representations of images of the training dataset of images approaches a predetermined prior distribution and that a reconstruction error of reconstructed images of the training dataset of images is minimized. Subsequently, anomalies are detected in the latent representation and the Adversarial Autoencoder is trained in a second training with the training dataset of images, but taking into account the detected anomalies. The anomalous image among the first dataset of images is detected by the trained Adversarial Autoencoder dependent on at least one of the reconstruction error of the image and a probability density under the predetermined prior distribution.

23 Claims, 3 Drawing Sheets

(51) Int. Cl.
*G06N 3/04* (2006.01)
*G06N 5/04* (2006.01)

(52) U.S. Cl.
CPC ......... *G06N 3/0454* (2013.01); *G06N 3/0472* (2013.01); *G06N 5/045* (2013.01)

(56) References Cited

U.S. PATENT DOCUMENTS

2017/0279834 A1* 9/2017 Vasseur .................. G06N 20/00
2020/0020098 A1* 1/2020 Odry ..................... G06K 9/6245
2020/0234468 A1* 7/2020 Lerchner ................. G06T 9/002

OTHER PUBLICATIONS

Xia et al., "Learning Discriminative Reconstructions for Unsupervised Outlier Removal", 2015, Proceedings of the IEEE International Conference on Computer Vision (ICCV), pp. 1511-1519 (Year: 2015).*

Schreyer et al., "Detection of Anomalies in Large Scale Accounting Data using Deep Autoencoder Networks", Sep. 15, 2017, arXiv:1709.05254v1, pp. 1-15. (Year: 2017).*

A. Makhzani et al., "Adversarial Autoencoders," arXiv preprint arXiv:1511.05644 (2015).

E. Prinicipi et al., "Acoustic Novelty Detection with Adversarial Autoencoders," IEEE 2017 International Joint Conference on Neural Networks (IJCNN), pp. 3324-3330 (May 2017).

B Schoklopf et al., "Support vector method for novelty detection," Advances in neural information processing systems, pp. 582-588 (2000).

Erfani, et al.: "High-dimensional and large-scale anomaly detection using a linear one-class SVM with deep learning", Pattern Recognition 58 (2016), pp. 121-134.

Leveau and Joly: "Adversarial autoencoders for novelty detection", HAL: https://hal.inria.fr/hal-01636617, Workshop track—ICLR 2017, pp. 1-6.

Xia, et al.: "Learning Descriminative Reconstructions for Unsupervised Outlier Removal", CVF (Computer Vision Foundation), IEEE (2015), pp. 1511-1519.

* cited by examiner

METHOD FOR DETECTING AN ANOMALOUS IMAGE AMONG A FIRST DATASET OF IMAGES USING AN ADVERSARIAL AUTOENCODER

CROSS-REFERENCE TO RELATED APPLICATIONS

The present application claims priority under 35 U.S.C. § 119 to EP 17198775.3, filed in Europe on Oct. 27, 2017, the content of which is hereby incorporated by reference herein in its entirety.

FIELD OF THE INVENTION

The present invention relates to a method, a computer program, a non-transitory computer-readable medium on which are stored instructions that are executable by a processor, as well as a computing device, for example, programmed processing circuitry configured, for detecting one or more anomalous images among a first dataset of images using an Adversarial Autoencoder.

BACKGROUND

Adversarial Autoencoders are disclosed in A. Makhzani et al., "Adversarial Autoencoders," arXiv preprint arXiv: 1511.05644 (2015). A method for anomaly detection is described in E. Principi et al., "Acoustic Novelty Detection with Adversarial Autoencoders," IEEE 2017 International Joint Conference on Neural Networks (IJCNN), pp. 3324-3330 (May 2017).

An unsupervised One-Class Support Vector Machine (SVM) algorithm is disclosed in "B. Schölkopf et al., "Support vector method for novelty detection," Advances in neural information processing systems, pp. 582-588 (2000).

SUMMARY

The presented method for detecting one or more anomalous images among a first dataset of images uses an Adversarial Autoencoder being trained in a first training with a training dataset of images, where the Adversarial Autoencoder is optimized such that a distribution of latent representations of images of the training dataset of images approaches a predetermined prior distribution and that a reconstruction error of reconstructed images of the training dataset of images is minimized. After the first training of the Adversarial Autoencoder, anomalies are detected in the latent representation and the Adversarial Autoencoder is trained in a second training with the training dataset of images, but taking into account the detected anomalies. The one or more anomalous images among the first dataset of images are detected by the trained Adversarial Autoencoder dependent on at least one of the reconstruction error of the image and the probability density under the predetermined prior distribution.

The presented method addresses the problem of visual anomaly detection by learning from an at least partly unlabeled training dataset of images, which can contain an unknown number of anomalies, i.e., a "polluted" training set. The method can reliably identify anomalies in images that were not contained in the training set. The method can also be applied in an active semi-supervised setup, where the algorithm takes an unlabeled dataset as its input, and queries the user to supply labels for a small fraction of data points. A further advantage is that the method is not restricted to only outputting an anomaly score, but can identify the training examples that are likely anomalies, so that the function of the system can be checked by domain experts.

The method introduces further criteria for anomaly detection, which reduce the number of false positives and false negatives by combining reconstruction and latent information. By altering the training set during training, the method becomes specifically robust against polluted datasets. Furthermore, the interactive semi-supervised approach can make optimal use of very sparse feedback from domain experts that can provide a small number of labels.

It does not require a representative set of all possible anomalies contained in the training data. It is sufficient that anomalies manifest themselves in a significant deviation from the normal dass, but there can be many diverse forms of anomalies.

The method has a more general applicability than other methods strictly requiring that all training data is from the normal dass. Such methods quickly lose performance if this condition is violated. For example, methods using normal autoencoders in a setup with polluted data also learn to reconstruct anomalies very well, and thus the threshold on reconstruction error does not provide a robust criterion for detecting anomalies. Instead, the presented method is applicable in the setting where no labels are needed for the training data, and a small fraction of the training data can be anomalous.

If domain experts are available for labeling a small fraction of the training data, the presented method can process the training data and search specifically for those examples, which would provide the greatest performance gain if a label was known.

By using an Adversarial Autoencoder, the method gains control over the desired distribution in latent space and can use a density estimate in latent space as an additional criterion for anomaly detection. This leads to a better criterion than using the reconstruction error of the autoencoder alone. The Adversarial Autoencoder also serves as a generative model of the learned data distribution and can be used to generate samples from the normal or identified abnormal classes to verify that the learned model is meaningful.

If prior information about the nature of anomalies is known, e.g., the expected number of different typically observed anomalies, this can be used in the Adversarial Autoencoder to shape the desired distribution in latent space.

The presented method automatically detects training examples that are likely to be anomalous during training, making the performance robust to changing anomaly rates.

In preferred embodiments, the detection of the anomalies in the latent representation is done using a one-class support vector machine or a local outlier factor algorithm. The presented method can be used with various methods handling the detected anomalies. Preferred embodiment for this anomaly handling include at least one of (a) anomalies detected in the latent representation being excluded from the training set for the second training, (b) using a weighted loss function for tuning the Adversarial Autoencoder in at least one subsequent training, where anomalies detected in the latent representation receive a reduced weight in the at least one subsequent training, (c) modifying a reconstruction target for each of a set of the anomalies detected in the latent representation to a noise-corrupted version of itself for at least one subsequent training, and (d) modifying a reconstruction target for each of a set of the anomalies detected in the latent representation to an image close or closest in the latent space that is identified as no anomaly in at least one subsequent training. Using these functions separately or in combinations provides a robust and effective training of the Adversarial Autoencoder.

In preferred embodiments, the method outputs an anomaly score for images in the first dataset of images calculated based on at least one of a reconstruction error and a probability density under the predetermined prior distribution. This provides a differentiated and precise feedback on the anomaly.

In preferred embodiments, the method is used in visual quality inspection, medical image analysis, visual surveillance, or automated driving.

DETAILED DESCRIPTION

Figure 1:
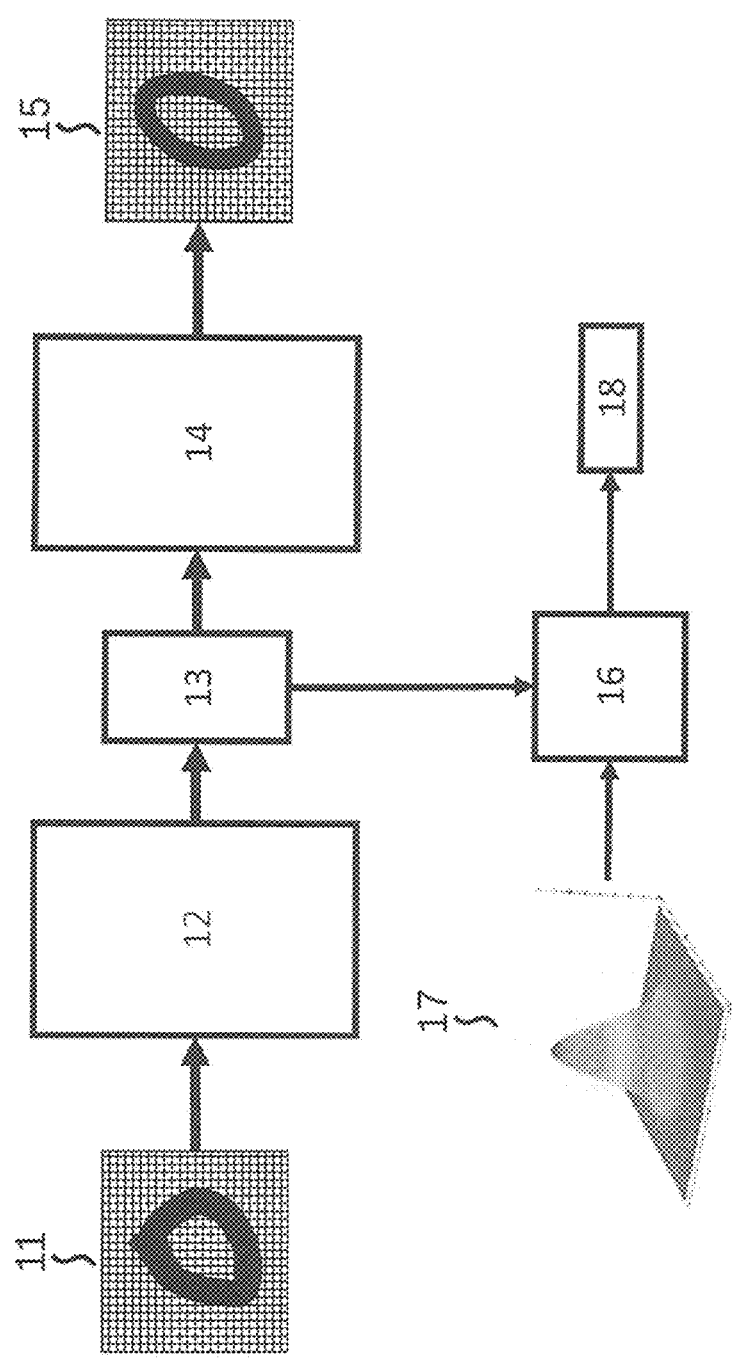
FIG. 1 schematically shows an exemplary Adversarial Autoencoder framework with a two-dimensional Gaussian as prior distribution, according to an example embodiment of the present invention.

A variety of machine learning methods exist to identify anomalies or outliers in a given set of images. Whereas it is assumed that images from the normal class share many similar features, outliers are characterized by a significant deviation from the normal class. Furthermore, it is assumed that the training data is either entirely composed of normal images, or only a small fraction of the images are anomalies. Typical applications of visual anomaly detection are for visual quality inspection, medical image analysis, or for surveillance tasks.

The approaches for anomaly detection can be classified as supervised, semi-supervised, or unsupervised, as follows.

Supervised: each image in the training set contains a label indicating whether it belongs to the normal dass or is an anomaly. This also subsumes the case where all available training data is assumed to be normal.

Semi-supervised: most images are unlabeled, but for some images, it is known whether they are anomalies or belong to the normal class.

Unsupervised: no labels are known; whether an image is an anomaly needs to be learned by comparing characteristics of the majority class and eventual outliers.

A further distinction can be made between methods that only identify anomalies on one fixed dataset, and those that learn from a training set and generalize to previously unseen images.

One approach for visual anomaly detection is the use of autoencoders, which are neural networks with multiple hidden layers that include an encoding stage and a decoding stage. The encoder is trained to map an input image to a lower-dimensional latent representation, from which the decoder learns to reconstruct the original image. The goal is to minimize the reconstruction error of the autoencoder. By having a lower-dimensional latent representation, a bottleneck is introduced which requires the encoder to focus on characteristic features of the image, and prevents learning trivial solutions such as an identity function. The quality of the autoencoder is measured by the reconstruction error, typically the mean squared error over all pixels. Since the target output of the autoencoder is the input image, autoencoder training is unsupervised.

Autoencoders can be used for anomaly detection on image and other data. The idea is that an autoencoder trained only on normal data learns a model of the normal dass, i.e., it can reconstruct normal images with very small training error, but the reconstruction error on anomalous data will be higher. An anomaly detector based on autoencoders would then impose a threshold on the reconstruction error and consider all images that exceed the threshold as an anomaly. This has been applied successfully to visual and auditory quality inspection problems.

One assumption in autoencoder approaches for anomaly detection is that all training examples are from the normal dass, which makes those approaches fall into the category of supervised learning as defined above, even though the auto-encoder training itself is unsupervised. In a more realistic and more challenging scenario, the training set can contain anomalies, but it is unknown beforehand which images are anomalous and which are not. This case of "polluted training data" is likely to occur in a real-world scenario where it might be too burdensome or even impossible to have all training points labeled by humans, or where there might be annotation error. For the considered sets of "polluted training data," it can be assumed that the fraction of anomalies in the training data is low (in the range <5%) and that the normal dass has relatively little variability, but anomalies can have very diverse forms. In this scenario, the performance of autoencoders for anomaly detection degrades already with small percentages of anomalies.

Now, it is proposed to use an extension of autoencoders, an Adversarial Autoencoder for anomaly detection. A schematic framework is shown in FIG. 1. The Adversarial Autoencoder includes an encoder 12, a decoder 14, and a discriminator network 16. Images 11 of a training set of images are input to the encoder 12, which encodes the inputs into latent representations 13. The decoder 14 decodes the latent representatives into reconstructed images 15. The encoder 12 and the decoder 14 of the Adversarial Autoencoder are trained to minimize the reconstruction error of the images in the training set.

The Adversarial Autoencoder induces a prior distribution on the latent low dimensional space. This prior distribution can be predetermined and can be input into the Adversarial Autoencoder. Various probability density function can be used as a prior distribution. In a preferred embodiment for anomaly detection, a multivariate Gaussian is used, e.g., a Standard Gaussian, such that latent representations of normal images cluster around the origin. Alternatively, a mixture of Gaussians distribution with one or more dedicated rejection classes (for anomalies) can be used, especially when the number of different anomaly classes is known. In FIG. 1, a two-dimensional Gaussian 17 is input into discriminator network 16 of the Adversarial Autoencoder. The Adversarial Autoencoder enforces that the distribution of the latent representations of the input images of the training set of images follows the prescribed prior by training the discriminator network 16, which learns to distinguish representations for images from the desired prior distribution.

This procedure does not require any labels about the content of each image (i.e., whether it is an anomaly or not). By training the autoencoder, a latent representation of each image is learned, and the adversarial part of the Adversarial Autoencoder ensures that the distribution of latent representations follows the given prior distribution. The overall training target is to optimize the Adversarial Autoencoder such that the latent representation becomes indistinguishable from the prior, while at the same time minimizing the reconstruction error in the decoder part.

Once the Adversarial Autoencoder is trained, it can be used to compute two different indicators whether a presented image is an anomaly. First, a high reconstruction error (exceeding some threshold) is a sign for an anomaly. Second, a small probability density under the given prior distribution for the latent space is also an indicator that the image might be an outlier. A combination of the two measures is more robust in detecting anomalies than any single one of them.

In a preferred embodiment, the prior distribution is chosen such that most of the probability mass lies around the center of the distribution (e.g., the origin with a standard multivariate Gaussian), so the density for anomalies can be expected to be low. Images that have nearby representations in latent space can be expected to lead to similar images after decoding. That means that even if images from different classes are mapped to nearby latent representations, the reconstruction error will be significantly higher for one of them.

Figure 2:
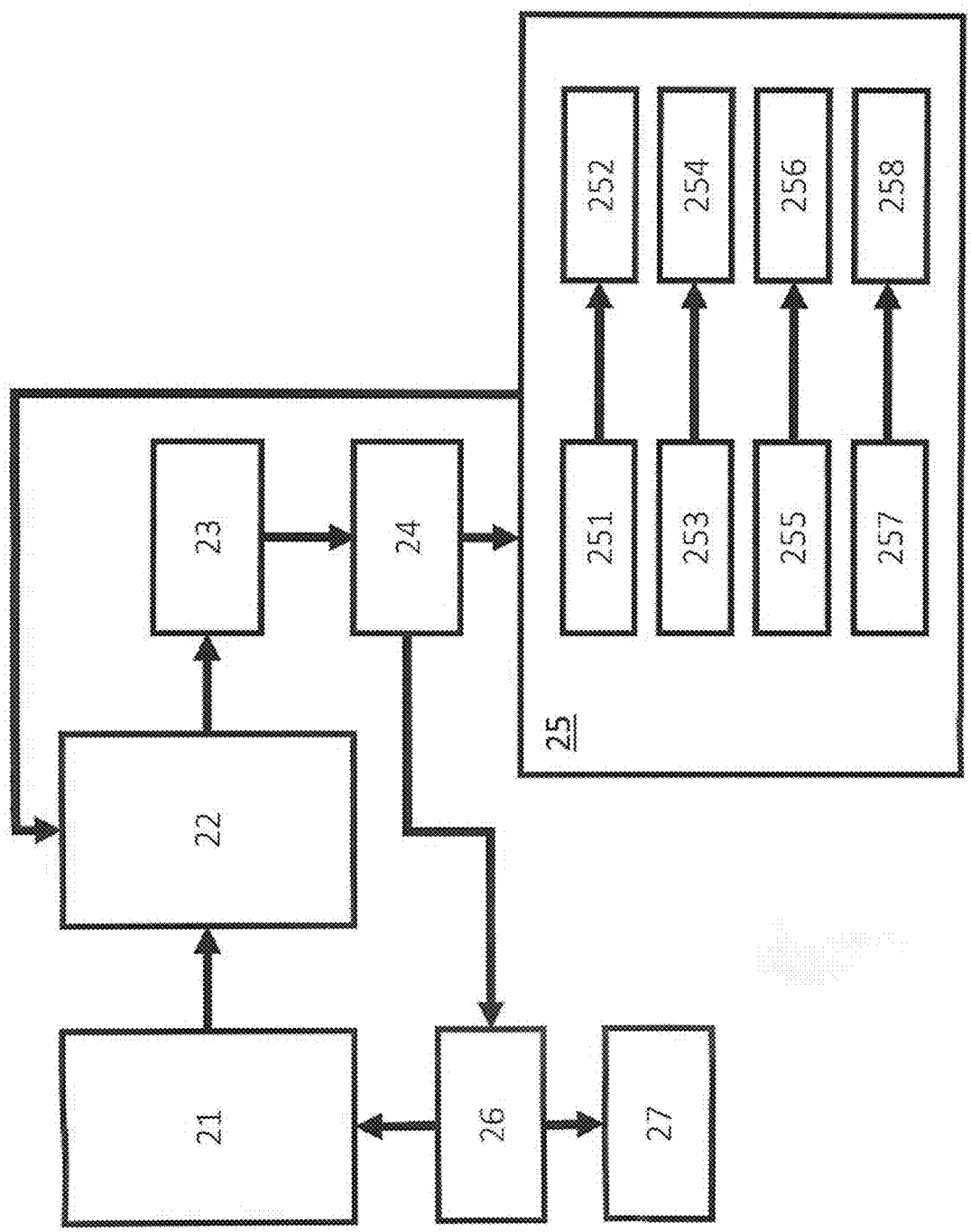
FIG. 2 is a flowchart that illustrates a method for detecting an anomalous image with unsupervised training using polluted training data, according to an example embodiment of the present invention.

FIG. 2 schematically shows an exemplary embodiment of a method for detecting an anomalous image with unsupervised training based on polluted training data, using an Adversarial Autoencoder. In this embodiment, it is assumed that no labels for the images are available during the whole training procedure, but there is a rough estimate of the anomaly rate $\alpha$. In this case, an anomaly detection in the latent space can be performed, e.g., with the unsupervised One-Class Support Vector Machine algorithm. In this approach, the kernel-transformed normal data can be separated from the origin by a decision boundary whereas the kernel-transformed anomalies lie on the other side of the boundary closer to the origin. It requires to specify the anomaly rate $\alpha$ which is then translated into a regularization parameter $\beta=1/(\alpha \times \text{number of training examples})$ for the One-class Support Vector Machine, which controls how many data points are expected to lie outside of the decision boundary. The data points identified as potential anomalies are then processed to modify the training dataset. Training of the Adversarial Autoencoder is then continued on the modified dataset.

In this embodiment, a second anomaly rate v, which is a fraction of the assumed anomaly rate $\alpha$, is defined. This second anomaly rate v is then used for iteratively detecting anomalies during training.

The unsupervised training procedure shown in FIG. 2 works as follows. In a step 21, a training set of images is loaded and used in step 22 to train the Adversarial Autoencoder for a certain number of iterations. In general, it should not be too large to avoid exhaustive training on all data including anomalies. This yields an initial latent representation for each image. In Step 23, potential anomalies in the current latent space are detected. To this end, a One-class Support Vector Machine is trained with regularization parameter $\beta$ computed from the update-step anomaly rate v. In step 24, it is checked whether the detected anomalies reach anomaly rate $\alpha$ or a user-defined rate close to $\alpha$. If not, the method continues with step 25, taken into account the detected or potential anomalies.

The functions 251/252, 253/254, 255/256, and 257/258 can be used as alternatives for handling the anomalies, but also combinations of the described approaches are possible. At least one of the shown functions is implemented or activated. In step 251, it is checked whether potential anomalies should be excluded from the training set until the next reset of the dataset occurs (step 21). If yes, this is carried out in step 252. In step 253, it is checked whether a weighted loss function should be used for tuning the autoencoder and potential anomalies receive a reduced weight for the following training steps. If yes, this is carried out in step 252. In step 255, it is checked whether the reconstruction target for a detected anomaly should be modified to a noise-corrupted version of itself, such that the autoencoder no longer tries to perfectly reconstruct such images. If yes, this is carried out in step 256. In step 257, it is checked whether the reconstruction target for a detected anomaly should be changed to the next closest image (in latent space) that is identified as belonging to the normal dass. This also has the effect of focusing the training of the autoencoder on those examples that are likely normal. If yes, this is carried out in step 258.

After such handling of the detected anomalies, the Adversarial Autoencoder is again trained for a certain number of iterations. The number of training iterations depends on the task. In general, it should not be too large to avoid exhaustive training on all data including anomalies. Steps 22-25 are repeated until the fraction of detected anomalies reaches a percent or a user-defined rate close to $\alpha$ and this is determined in step 24. In this case, the method proceeds to step 26 where it is checked whether the training of the Adversarial Autoencoder has sufficiently converged. If this is the case, the training is concluded with step 27 and the Adversarial Autoencoder can be used for detecting anomalies in sets of images. If the training has not yet sufficiently converged, the training of the Adversarial Autoencoder is continued with step 21, loading or resetting the training set of pictures. However, the current weights are still used.

Figure 3:
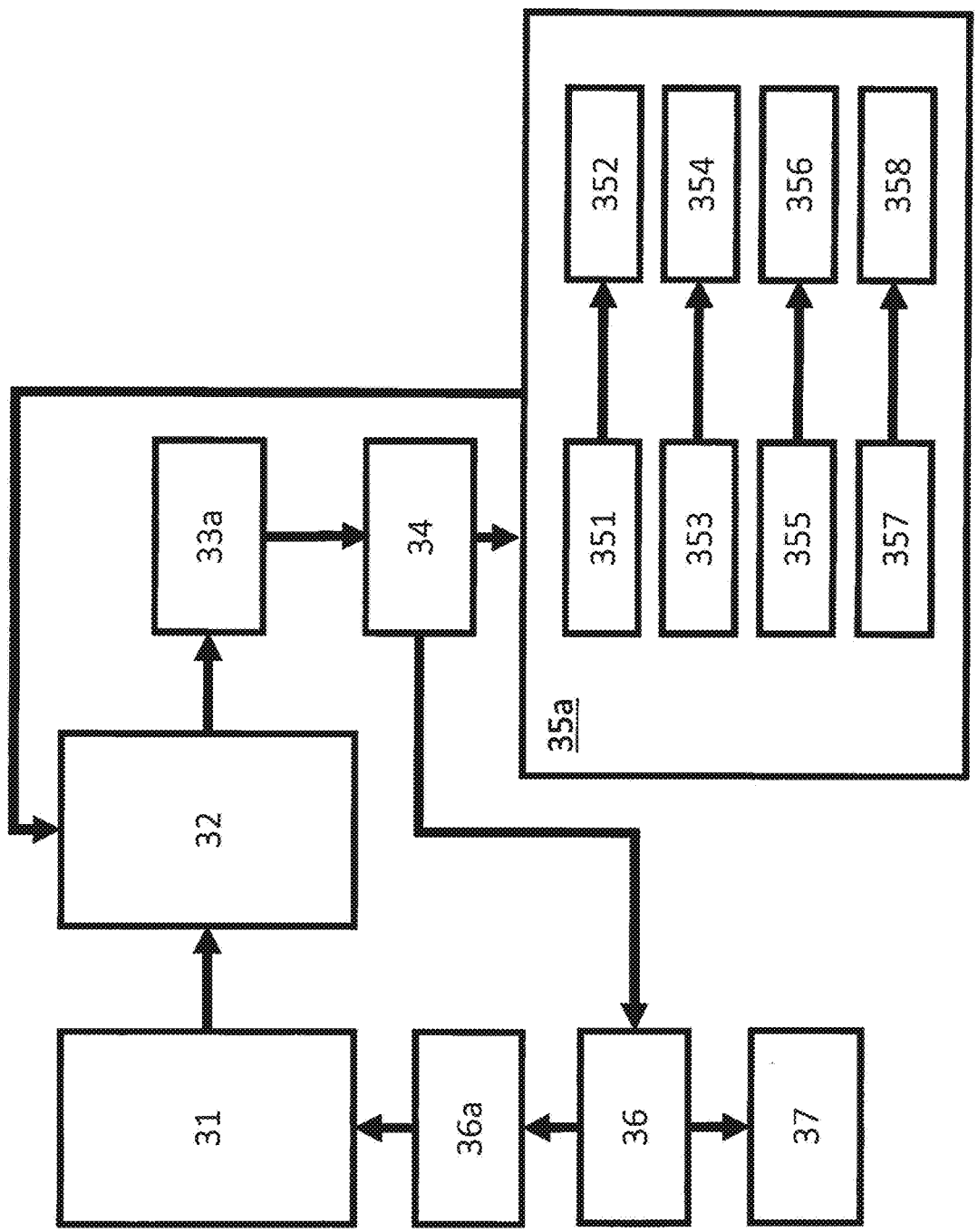
FIG. 3 is a flowchart that illustrates a method for detecting an anomalous image with semi-supervised training using polluted training data, according to an example embodiment of the present invention.

FIG. 3 schematically shows an exemplary embodiment of a method for detecting an anomalous image with semi-supervised training using polluted training data. Instead of a fully unsupervised approach as described above, the method for detecting anomalies in images can also incorporate sparse interactive feedback by the user, in which he is presented with potential anomalies and decides whether they belong to the normal class or not. This semi-supervised approach shown in FIG. 3 is described in the following, focusing on the differences to the unsupervised approach shown in FIG. 2.

Steps 31 and 32 correspond to steps 21 and 22, respectively, described above. In step 33a, as in step 23, a One-class Support Vector Machine with regularization parameter $\beta$ computed from the update-step anomaly rate v is trained, but all images previously labeled (especially by user feedback) as normal or anomalies are excluded. Step 34 corresponds to step 24 described above. In step 35a, the automatically and the user-detected anomalies are handled. The functions 351-358 used correspond to functions 251-258 described above. After step 35a, the method again continues with step 32, whereas in the training all user-identified normal instances are included for training. Steps 32-35 are repeated until the fraction of detected anomalies reaches a percent and this is determined in step 34. In this case, the method proceeds to step 36 where it is checked whether the training of the Adversarial Autoencoder has sufficiently converged. If this is the case, the training is concluded with step 37 and the Adversarial Autoencoder can be used for detecting anomalies in sets of images. If the training has not yet sufficiently converged, the training of the Adversarial Autoencoder is continued with step 31, loading or resetting the training set of pictures. However, the current weights are still used.

The number of images the user has to label can be implemented as a parameter that the user can choose, e.g., in addition to choosing how frequently he is asked about newly identified anomalies. Furthermore, it can be implemented that the user can choose how detected potential anomalies are handled, i.e., which of the functions in step 35a should be used.

The One-class Support Vector Machine provides a measure of how close instances are to the decision boundary. The most informative examples for anomaly detection are those that are close to the boundary, and should be preferentially presented to the user to be labeled. The potential anomalies can be sorted by their distance to the decision boundary, and the user can select that the potential anomalies presented to him must lie within the top x-% of the examples closest to the boundary.

The anomaly decision threshold can be chosen based on reconstruction error and can depend on the distribution of reconstruction errors obtained during training. Several alternatives are possible to determine this threshold, several examples of which include:
1. the maximum reconstruction error observed during training (this makes sense if the training set contains only normal data);
2. a percentile of reconstruction errors, e.g., the 95% percentile, such that only 5% of all training images exceed this reconstruction error; and
3. an adaptive threshold that depends on the expected anomaly rate $\alpha$, such as the $(1-\alpha)$% percentile.

After the Adversarial Autoencoder is trained, it can be used to identify anomalies in new data sets. A new image is processed by the encoder and decoder of the Adversarial Autoencoder, and preferably a combination of reconstruction error and density of the latent representation (especially in a 2D space) is used to classify the new image as normal or as an anomaly.

Already in the unsupervised case it is often possible to distinguish normal for anomalous data by learning a boundary in the 2-dimensional space where one axis shows the reconstruction error, and the second axis shows the density of the latent representation. If labels from user feedback are known, these can be used to improve the separation between the two classes, e.g., by increasing their weight in computing the error of the classifier compared to the unlabeled points.

The presented method has the potential to be used in a number of practically relevant domains.

In visual quality inspection, photos of parts produced by a machine are collected, and an automated identification of potentially faulty parts is performed. Under the assumption that the majority of all produced parts is functional, this becomes a typical anomaly detection task, and historical yield rates (from customer feedback or domain experts) can provide a good estimate of the expected anomaly rate. Since it is expensive and time consuming to generate labels, the unsupervised approach is particularly interesting for industrial mass production, but also for fabrication of precision machinery (e.g., 3D printing).

In visual surveillance, frames from a video stream can be recorded and compared. Unusual recordings correspond to anomalies, which might require the attention of a human supervisor or activate some alarm. This has obvious applications for surveillance cameras, but could in principle also be used to detect faulty sensors.

In medical image analysis, anomaly detection helps in identifying unusual structures in medical images, which might provide evidence for a medical condition (under the assumption that the vast majority of patients are healthy). Applications are in all fields of medical imaging, including radiology, ultrasound, PET scans, or microscopy analysis.

In dataset cleaning for large databases of images, anomaly detection can identify outliers, which should be carefully checked and potentially re-labeled. This is a useful pre-processing step for all methods working on big data, e.g., large scale machine learning or computer vision, with the benefit that the elimination of anomalous data prevents learning of wrong concepts.

In autonomous driving, visual anomaly detection can identify scenes that are out of scope of the training data on which the autopilot was trained. In such situations it might be advisable to hand control back to the human driver to avoid safety issues.

The method can also be used for the analysis of image-like data. Although some sensors do not produce images, their recordings can be represented as images, e.g., spectrograms after Fourier Transform. This allows using the presented methods to identify anomalous recordings from other sensory domains, e.g., anomalous sounds or radar recordings, if the Adversarial Autoencoder is applied to the 2-dimensional spectrograms.

What is claimed is:

1. A method comprising:
   in a first training, training an Adversarial Autoencoder using a training dataset of images, thereby optimizing the Adversarial Autoencoder such that:
      a distribution of latent representations of images of the training dataset of images approaches a predetermined prior distribution; and
      a reconstruction error of reconstructed images of the training dataset of images is minimized;
   after the first training, detecting anomalies in the latent representations of images of the training dataset of images;
   in a second training, training the Adversarial Autoencoder using the training dataset of images and taking into account the detected anomalies; and
   detecting an anomalous image among a first dataset of images by the trained Adversarial Autoencoder dependent on one or both of the following: a reconstruction error of the anomalous image and a probability density under the predetermined prior distribution;
   wherein:
      the anomalies detected in the latent representation are taken into account in the second training by excluding detected anomalies from the training set for the second training, or
      the anomalies detected in the latent representation are taken into account in the second training by using a weighted loss function for tuning the Adversarial Autoencoder in at least one subsequent training, by which weighted loss function anomalies detected in the latent representation receive a reduced weight in the at least one subsequent training, or
      the anomalies detected in the latent representation are taken into account in the second training by modifying a reconstruction target for each of a set of the anomalies detected in the latent representation to a noise-corrupted version of itself for at least one subsequent training, or
      the anomalies detected in the latent representation are taken into account in the second training by modifying a reconstruction target for each anomaly of a set of the anomalies detected in the latent representation to an image, closest in terms of distance to the anomaly in the latent space, that is identified as not being anomalous in at least one subsequent training.

2. The method of claim 1, wherein the detection of the anomalies in the latent representation is done using a one-class support vector machine and the detection of the anomalies in the latent representation is done dependent on a user-defined anomaly rate, wherein a decision boundary of the one-class support vector machine depends on the user-defined anomaly rate.

3. The method of claim 1, wherein the detection of the anomalies in the latent representation is done dependent on at least one of the reconstruction error of the reconstructed images and the probability density under the predetermined prior distribution.

4. The method of claim 1, wherein the detection of the anomalies in the latent representation is done using a one-class support vector machine or a local outlier factor algorithm.

5. The method of claim 1, wherein the anomalies detected in the latent representation are taken into account by excluding detected anomalies from the training set for the second training.

6. The method of claim 1, wherein the anomalies detected in the latent representation are taken into account by using the weighted loss function for tuning the Adversarial Autoencoder in the at least one subsequent training.

7. The method of claim 1, wherein the anomalies detected in the latent representation are taken into account by modifying the reconstruction target for each of the set of the anomalies detected in the latent representation to the noise-corrupted version of itself for the at least one subsequent training.

8. The method of claim 1, wherein the anomalies detected in the latent representation are taken into account by modifying the reconstruction target for each anomaly of the set of the anomalies detected in the latent representation to the image, closest in terms of distance to the anomaly in the latent space, that is identified as not being anomalous in the at least one subsequent training.

9. The method of claim 1, wherein the first training and the second training are repeatedly conducted consecutively a predefined number of times or until a training target is reached.

10. The method of claim 1, wherein the first training includes a predefined number of iterations.

11. The method of claim 1, wherein the second training includes a predefined number of iterations.

12. The method of claim 1, wherein the predetermined prior distribution includes at least one dedicated rejection class.

13. The method of claim 1, wherein images of the training dataset of images are initially unlabeled.

14. The method of claim 1, wherein the method includes a query to a user to identify a presented image as normal or anomalous.

15. The method of claim 14, wherein the detected anomalies in the latent representation taken into account in the second training include user-identified anomalies.

16. The method of claim 14, wherein the detection of the anomalies in the latent representation is done using a one-class support vector machine or a local outlier factor algorithm trained in a training that excludes images of the training dataset of images identified by the user as normal or as anomalous.

17. The method of claim 14, wherein images presented to the user are selected dependent on respective anomaly scores.

18. The method of claim 17, wherein each of the anomaly scores is calculated based on at least one of the reconstruction error and the probability density under the predetermined prior distribution.

19. The method of claim 1, wherein an anomaly score for images in the first dataset of images is output.

20. The method of claim 1, wherein an anomaly score for images in the training dataset of images is output.

21. The method of claim 1, further comprising using the detection of the anomalous image in a visual quality inspection, in a medical image analysis, in a visual surveillance, or in an automated driving.

22. A non-transitory computer-readable medium on which are stored instructions that are executable by a processor and that, when executed by the processor, cause the processor to perform a method, the method comprising:
  in a first training, training an Adversarial Autoencoder using a training dataset of images, thereby optimizing the Adversarial Autoencoder such that:
    a distribution of latent representations of images of the training dataset of images approaches a predetermined prior distribution; and
    a reconstruction error of reconstructed images of the training dataset of images is minimized;
  after the first training, detecting anomalies in the latent representations of images of the training dataset of images;
  in a second training, training the Adversarial Autoencoder using the training dataset of images and taking into account the detected anomalies; and
  detecting an anomalous image among a first dataset of images by the trained Adversarial Autoencoder dependent on one or both of the following: a reconstruction error of the anomalous image and a probability density under the predetermined prior distribution;
  wherein:
    the anomalies detected in the latent representation are taken into account in the second training by excluding detected anomalies from the training set for the second training, or
    the anomalies detected in the latent representation are taken into account in the second training by using a weighted loss function for tuning the Adversarial Autoencoder in at least one subsequent training, by which weighted loss function anomalies detected in the latent representation receive a reduced weight in the at least one subsequent training, or
    the anomalies detected in the latent representation are taken into account in the second training by modifying a reconstruction target for each of a set of the anomalies detected in the latent representation to a noise-corrupted version of itself for at least one subsequent training, or
    the anomalies detected in the latent representation are taken into account by modifying a reconstruction target for each anomaly of a set of the anomalies detected in the latent representation to an image, closest in terms of distance to the anomaly in the latent space, that is identified as not being anomalous in at least one subsequent training.

23. A computer comprising a processor programmed to execute a method, the method comprising:

in a first training, training an Adversarial Autoencoder using a training dataset of images, thereby optimizing the Adversarial Autoencoder such that:
- a distribution of latent representations of images of the training dataset of images approaches a predetermined prior distribution; and
- a reconstruction error of reconstructed images of the training dataset of images is minimized;

after the first training, detecting anomalies in the latent representations of images of the training dataset of images;

in a second training, training the Adversarial Autoencoder using the training dataset of images and taking into account the detected anomalies; and detecting an anomalous image among a first dataset of images by the trained Adversarial Autoencoder dependent on one or both of the following: a reconstruction error of the anomalous image and a probability density under the predetermined prior distribution;

wherein:
- the anomalies detected in the latent representation are taken into account in the second training by excluding detected anomalies from the training set for the second training, or
- the anomalies detected in the latent representation are taken into account in the second training by using a weighted loss function for tuning the Adversarial Autoencoder in at least one subsequent training, by which weighted loss function anomalies detected in the latent representation receive a reduced weight in the at least one subsequent training, or
- the anomalies detected in the latent representation are taken into account in the second training by modifying a reconstruction target for each of a set of the anomalies detected in the latent representation to a noise-corrupted version of itself for at least one subsequent training, or
- the anomalies detected in the latent representation are taken into account by modifying a reconstruction target for each anomaly of a set of the anomalies detected in the latent representation to an image, closest in terms of distance to the anomaly in the latent space, that is identified as not being anomalous in at least one subsequent training.

* * * * *